United States Patent [19]

Antogini

[11] 3,976,396

[45] Aug. 24, 1976

[54] DEVICE FOR CONVERTING FLUID FLOW INTO KINETIC ENERGY

[76] Inventor: Enrico Antogini, Wiregrass Farm, R.R. No. 3, Picton, Ontario, Canada

[22] Filed: Dec. 6, 1974

[21] Appl. No.: 530,406

[30] Foreign Application Priority Data

Jan. 7, 1974  Canada .............................. 189513

[52] U.S. Cl. .............................. 416/119; 416/117; 415/141
[51] Int. Cl.² ....................... F03D 9/00; F03D 3/06
[58] Field of Search ............... 415/3, 141; 416/119, 416/142, 143, 236, 188, 117

[56] References Cited
UNITED STATES PATENTS

| | | | |
|---|---|---|---|
| 195,114 | 9/1877 | Folsom ........................... | 415/141 X |
| 227,576 | 5/1880 | Read................................. | 415/141 |
| 1,369,542 | 2/1921 | Reed.................................. | 416/117 |
| 2,270,686 | 1/1942 | Moore .............................. | 416/188 |
| 3,012,709 | 7/1960 | Schnell ........................... | 416/236 A |

FOREIGN PATENTS OR APPLICATIONS

| | | | |
|---|---|---|---|
| 535,286 | 4/1922 | France................................. | 415/3 |
| 8,713 | 4/1912 | United Kingdom................. | 416/188 |

*Primary Examiner*—Martin P. Schwadron
*Assistant Examiner*—Robert J. Miller

[57] ABSTRACT

The present invention relates to a device for converting fluid flow kinetic energy into rotational kinetic energy comprising a body mounted for vertical rotation about a longitudinal axis thereof, a plurality of horizontally spaced vertically extending vanes pivotably mounted on said body and rotatable between an open position in which the vane extends outwardly from the body and a closed position in which the vane lies with one surface thereof adjacent the surface of the body, and the plurality of feather members spacedly mounted longitudinally of each frame and extending outwardly and transversely of the surface opposite to said one surface of said vane, said feathers being dimensioned to abut said body when said vane is in said open position to provide stop means for each vane, the center gravity of each vane being located at the position in the feather members such that on the rotational speed of the body reaching a preselected maximum all the vanes assume a position between the open and closed position whereby the preselected rotational speed is a maximum for said body.

14 Claims, 11 Drawing Figures

DEVICE FOR CONVERTING FLUID FLOW INTO KINETIC ENERGY

The present invention relates to a device for converting fluid flow into kinetic energy, in particular wind energy, into rotational kinetic energy which rotational kinetic energy may be used to drive machines, particularly electric generators and alternators. In particular, the present invention provides such a device which more efficiently converts the fluid flow kinetic energy into rotational kinetic energy and which device is self-governing.

Wind motors, also referred to as windmills, are well known for converting wind kinetic energy into rotational kinetic energy. Such wind machines as have been heretofore proposed, generally comprise a rotor adapted to rotate about a horizontal or vertical axis, and have a plurality of vanes attached to the rotor usually by means of rods or frameworks which vanes are rotatable between an operative position in which they present their surfaces to the wind and thus offer resistance when they are moving in a direction generally downstream of the wind flow in which they are rotatable, and an inoperative position in which they present their edges to the wind, when they are moving in a direction generally upstream of the wind flow. Such devices in which the rotor rotates about a vertical axis have the advantages over those which the rotor rotates about a horizontal axis in eliminating the need for the vanes to be continuously rotated into the wind.

However, windmills in which the rotor rotates on a vertical axis heretofore proposed have the disadvantages of inefficiently using the wind thrust in obtaining rotation and the requirement for the presence of separate mechanical stops, struts or cables to maintain the vanes in their operative position and prevent the vanes from swinging indiscriminately. Further, the windmills either do not include governors to provide for a maximum speed offrotation of the rotor or include governors constructed with links and cables mounted throughout the device to set the position of the vanes in various angles to the wind flow. Again, the windmills heretofore proposed, consist of vanes which are mounted on all manner of towers, structures or frames made of rigid iron links or tubular connecting rods which structures are costly and also offer undue resistance to the wind. Such windmills have proven impracticable particularly in gale force winds and hurricanes.

The present invention provides a device for converting fluid flow kinetic energy, particularly wind kinetic energy into rotational energy which may be used to drive machines, e.g. a windmill, which is simple to construct, efficiently converts the kinetic energy of the fluid flow into rotational kinetic energy and which is self-governing to provide for a maximum pre-selected speed of rotation of the rotor irrespective of the velocity of the wind. In a particular desirable embodiment of the present invention, the weight of the device, particularly the rotor is substantially reduced and consequently also its construction costs.

It has now been found in accordance with the present invention that by providing as the rotor, a body mounted for vertical rotation about a longitudinal axis, a plurality of horizontally spaced vertically extending vanes pivotably mounted on said body and rotatable between an open position in which the vane extends outwardly from the body and a closed position in which the vane lies with one surface thereof adjacent the surface of the body and a plurality of feather members spacedly mounted longitudinally of each vane and extending outwardly and transversely of the surface opposite to the one surface of the vane, the feathers being dimensioned to abut the body when the vane is in its open position to provide a stop means for each vane. The device operates with a high efficiency in converting fluid flow kinetic energy, particularly wind energy, into rotational kinetic energy for driving machines, and, in particular, makes greater allowance for and use of the dynamic properties of the air currents which are being used to give maximum amount of thrust. Further, it has been found that by providing that the centre of gravity of each vane is located at a position in the feather members on the rotational speed of the body reaching a pre-selected maximum all the vanes will assume a position between the open and closed position such that the pre-selected rotational speed becomes a maximum for the body, i.e. the device is self-governing.

According to the present invention, therefore, there is provided a device for converting fluid flow kinetic energy into rotational kinetic energy which device comprises a body mounted for vertical rotation about a longitudinal axis thereof, a plurality of horizontally spaced vertical extending vanes pivotably mounted on said body and rotatable between an open position in which the vane extends outwardly from the body and a closed position in which the vane lies with one surface thereof adjacent the surface of the body and a plurality of feather members spacedly mounted longitudinally of each vane and extending outwardly and transversely of the surface opposite to said one surface of said vane, said feathers being dimensioned to abut said body when said vane is in said open position and provide a stop means for each vane, the centre of gravity of each vane being located at a position in the feather members such that on the rotational speed of the body reaching a pre-selected maximum all the vanes assume a position between the open and closed positions whereby the preselected rotational speed becomes a maximum for said body.

The body which is mounted for vertical rotation i.e. the rotor, must be of a sufficient size to allow the vanes pivotably mounted thereon in their closed position to lie with one surface thereof adjacent the surface of the body. The body preferably has continuouly curved sidewalls and in one embodiment of the invention, is cylindrically shaped. Ideally, the body is ovoid and is mounted with its major axis vertical and with the end thereof remote from its minor axis lower than the other end thereof. The ovoid shape of the body of the rotor is ideal aerodynamically and offers the least wind resistance. However, variations of the ovoid shape may be used to advantage which shapes while not being aerodynamically ideal, are cheaper to construct. In particular, with the ovoid body in order to mount the vanes 1 longitudinally of the body, it is usually desirable to laterally split the vanes such that the vanes can follow precisely the contours of the body which are continuously vertically curved. In order to provide a unitary vane, it may be desirable to provide that the lower portion of the ovoid body is of a conical-shape, thus providing a linear surface of upon which the vanes are mounted.

In another embodiment of the present invention, the body may comprise a pair of cones joined at their bases with the upper cone having a larger conical angle than the lower cone. A particularly valuable advantage of the use of a generally ovoid body for the rotor is that it takes account of the fact that wind velocity changes in relation to the distance above the ground. Thus the greater the distance above the ground, the greater the wind velocity and a generally ovoid body is aerodynamically suitable to compensate for this variation in wind velocity with height. Generally it is preferable that the vanes also are tapered towards the lower end thereof. With such shape of the body and particularly also of the vane, the thrust of the wind against the vanes can be made approximately the same regardless of the altitude of the vane above the ground. This avoids wastage of a portion of the wind energy due to a twisting effect which has occurred heretofore in conventional windmills where the energy of the faster top vanes works against the slower bottom ones. By providing the broader part of the ovoid shape at the top and more pointed part at the bottom and providing that the vanes are also tapered, being broader at the top, and narrower at the bottom, so that the different wind velocities exert more nearly equal amount of thrust on every square inch of the rotor from top to bottom a more efficient conversion of wind energy into rotational kinetic energy is achieved.

In a particular desirable embodiment of the present invention the body is a hollow upright shell which allows the body to be built of a very thin steel, iron or plastic reinforced with fiberglass and thus weighs less than 10% per linear vertical foot than the conventional method of construction. This allows the device to be totally unobstructed by frameworks by any sort and utilizes up to 100% of the thrust of the wind blowing on it. Such reduction in weight of the device, brings with it a proportionately reduced friction in the bearings which support the rotor and thus the device can utilize approximately 90% more of the actual thrust of the wind per pound of weight of the device than conventional windmills.

A device according to the present invention includes a plurality of vanes pivotably mounted, preferably hingedly mounted on the surface of the body such that they can pivot, preferably about 90°, from an open position to a closed position. In the open position they offer maximum resistance to the wind as one of the surfaces of the vanes is essentially at right angles to the direction of the wind. In the closed position one of the surfaces of the vanes is folded against the body of the device and the vane thus offers a minimum resistance to the wind. The feather elements are rigidly mounted on the vanes, preferably at right angles thereto, and serve as stops to maintain the vanes in their open position and when the vanes are in their closed position they lie parallel to the direction of the wind presenting edges thereto and thus offer resistance to the wind only to the extent of the cross-section of their leading edges.

In order that the vanes may lie close to the surface of the body in their closed position, when the body has a cylindrical or generally ovoid structure, each vane is laterally curved and has a radius corresponding substantially exactly to the radius of the body so that when the vane lies against the body in its closed position, it offers essentially no resistance whatsoever to the wind. To provide each vane with maximum aerodynamic properties as well as structural rigidity the vane also has at the edge portion thereof remote from the pivot mounting a lateral curve in a direction opposite to that in the remainder of the vane. The edge portion has a much smaller radius which is desirable to prevent a vacuum forming between the vane in the closed position and the body. The return curve in the edge portion of the vane catches the wind towards the end of the vanes passage upstream of the wind or rotation of the body when it is drawn open. It will be seen that each square inch of the surface of the vane catches approximately double the volume of wind or receives twice the amount of thrust from the wind than that of a conventional vane as the body itself being a solid object deflects wind into the vane. This provides for a more efficient utilization of the rest of the wind and converting it into kinetic rotational energy.

The feather members serve two purposes: namely to stop the movement of the vane in its open position and to provide a means to govern the speed of rotation of the rotor of the device. Shape of the feathers is not critical although it is desirable to make each feather as large as possible so that the thrust of the wind on the vane is distributed on as much of the surface of the body as possible. In particular, it is desirable to have as many close spaced feathers as possible. This may be desirably achieved using modern casting techniques with lightweight plastic materials which would distribute the wind thrust over the almost entire surface of the body.

As heretofore stated the known windmills do not include a governor of any kind or they include governors constructed of links, struts, and cables mounted throughout the device to set the position of each frame at various angles. With the feather members in the device of the present invention, it is a relatively simple matter to make the device self-governing. In particular, certain power requirements are more adequately served by a windmill which turns slowly while others such as in the driving of an electric generator are better served by a windmill that turns faster. With the feather members and the vanes of the device of the present invention it is possible to construct a device which will turn exactly the required number of revolutions per minute simply by choosing the weight of its component parts during its manufacture so that the device acts as its own governor and keeps the speed at the preselected maximum. The principle only applies when the wind exceeds a certain minimum velocity. When the wind is not sufficient to drive the work load attached to the device, it is inoperative, a principle which applies to all windmills. In other words below certain speeds the windmill may turn but it will not perform useful work. Above this critical point, however, regardless of the wind speed of the device of the present invention can be governed with extreme accuracy. It has been found that all existing windmills become impractible since at high wind speed and with a mechanism which turns faster and faster as the wind blows, the windmill tends to be ripped apart by the centrifugal force generated.

In accordance with the present invention, by providing that the centre of gravity is located in the feather members such that it is behind the line of extension of the radius of the body through the hinge in the open position of the vane and ahead of it in the closed position of the vane then the centrifugal force will always tend to move the centre of gravity into such extension line and thus move the vanes from these positions to an intermediate position between the closed and open position. Thus, under the action of the centrifugal force each vane rotates against the wind and reduces the width of the vane facing the wind and thus the faster the rotation of the body of the device the greater the rotation of the vanes becomes until the thrust of the wind and the centrifugal force vector reach a balance and the rotation of the rotor of the windmill becomes constant irrespective of the speed of the wind. It will be seen that by selecting the particular materials of construction of the vane and feather members or different thicknesses of the materials or even by adding weights to the feathers, suitably at the time of the manufacture, it is possible to locate the centre of gravity at any desired position on the surface of the feathers, and thus to provide for governing of the maximum speed of rotation of the body of the device at any preselected speed. The particular choice of the materials and thicknesses and thus the particular location of centre gravity depends upon the workload which it is desired be attached to the device also the speed at which it is desired the work be performed. The device of the present invention is most suitably useful in driving electric generators or alternators which are built to give optimum output at given optimum speeds. Such a device workload is known, and also the speed at which the task of the generators and alternators is best performed is also known. Thus, knowing the given workload and given ideal speed all that is necessary is to choose the appropriate mass of the vane so that the centrifugal force vector will tend to slow down the windmill as soon as it exceeds the preselected speed.

The present invention will be further illustrated by way of the accompanying drawings in which.

Figure 1:
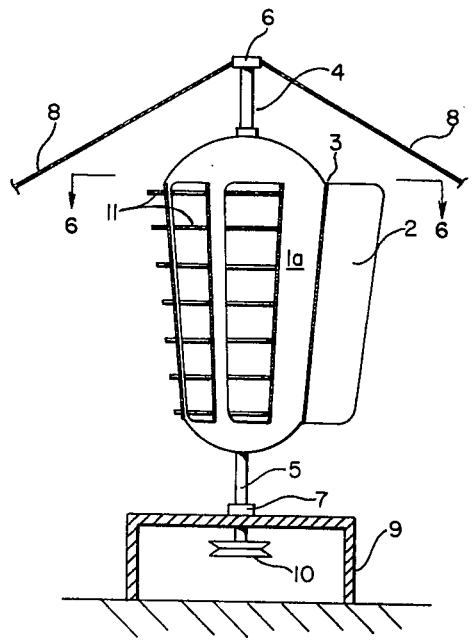
FIG. 1 is an elevation of a windmill in accordance with one embodiment of the present invention.

Referring to FIG. 1, the windmill comprises a hollow shell body 1 of generally ovoid shape with the lower portions 1a thereof generally cone-shaped providing a linear wall on which vanes 2 are pivotably mounted by means of continuous piano-type hinges 3. The body 1 is formed of a light, thin, strong material. The body 1 is mounted for rotation on vertical shafts 4 and 5 in a top bearing 6 and a bottom bearing 7 respectively. The top bearing 6 is maintained in position by guy wires 8 and the bottom bearing 7 is mounted on a base housing 9 which houses a power take-off pulley 10 mounted on the shaft 5.

Figure 7:
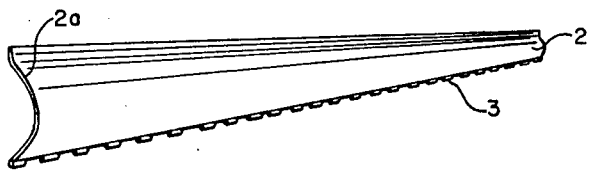
FIG. 7 is a perspective view of a vane without feather members in the windmill of FIG. 1.
Figure 8:
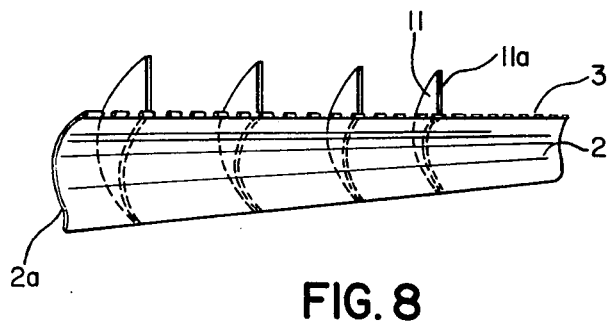
FIG. 8 is a detail of the vane of FIG. 7 including feather members.
Figure 9:
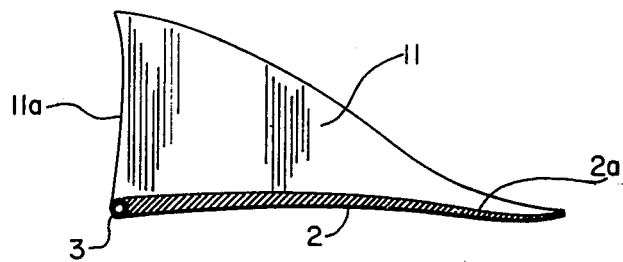
FIG. 9 is a section through the vane of FIG. 8.

Referring particularly to FIGS. 7, 8 and 9, each vane 2 is downwardly tapered and has a plurality of feather members 11 fixedly mounted thereon and at right angles thereto. The feather members 11 serve as stops for each vane in its fully open position during rotation of the body 1 downstream of the wind and have a curved edge 11a thereof which abuts the surface of the body 1 of the same radius as that of the body 1 at the place of abutment so as to provide a close fit therebetween. In a similar manner, the vane 2 is curved transversely thereof so as to lie in close abutment with the body 1 in its closed position when travelling upstream of the wind so as to offer substantially no wind resistance. This curve also has a radius of curvature the same as that of the body 1 at the place of abutment of the vane 2 with the body 1. In this closed position, the feather members 11 present only their edges to the wind and thus also offer minimum wind resistance. The edge portion 2a of each vane 2 remote from the hinge 3 is curved in the opposite direction, has a much smaller radius of curvature and serves to prevent a vacuum forming between the vane 2 and the body 1. This curved edge portion 2a catches the wind towards the end of the return cycled of the vane 2 upstream of the wind when the vanes 2 are being thrown open by the wind. The curved portions in the vane 2 thus provide maximum aerodynamic properties and also give the vane 2 structural rigidity.

Figure 6:
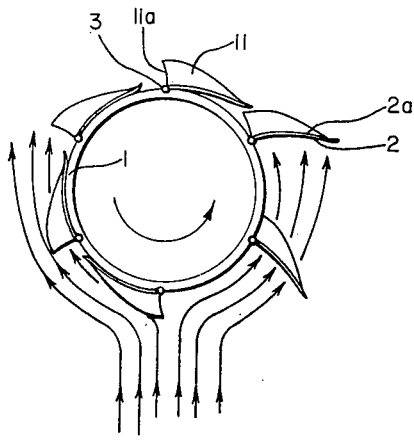
FIG. 6 is a section taken along the line 6—6 of FIG. 1.

Referring particularly to FIG. 6 it will be seen that each square inch of the vane 2 presented to the wind when traveling downstream of the wind receives about twice the thrust from the wind as compared to a conventional windmill because the body 1 deflects the wind into the vane 2.

Figure 2:
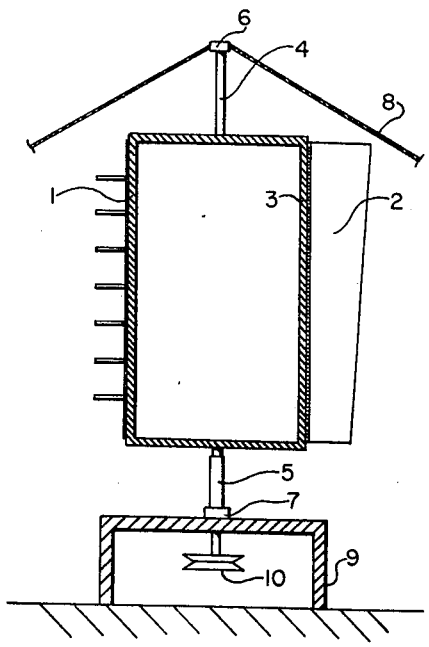
FIG. 2 is a sectional elevation of a windmill in accordance with another embodiment of the present invention.
Figure 3:
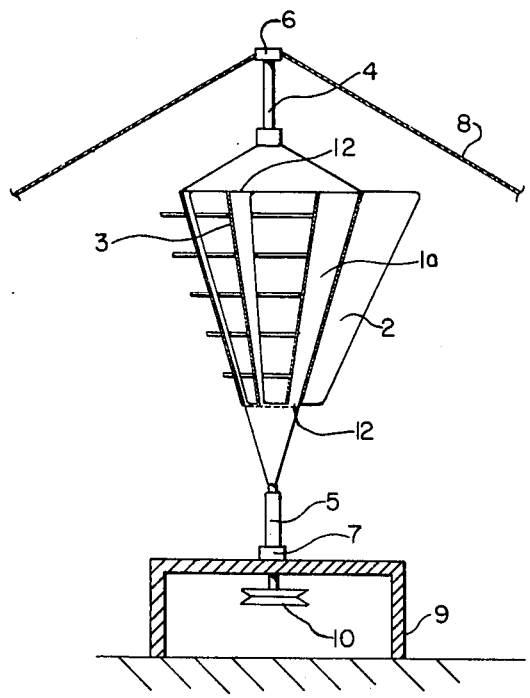
FIG. 3 is an elevation of a windmill in accordance with yet another embodiment of the present invention.

The windmill of FIG. 2 is the same as that in FIG. 1 except the body 1 is cylindrical in shape. The windmill of FIG. 3 is the same as that of FIG. 1 except the body 1 comprises two cones joined e.g. bolted together at their bases and includes diaphrams 12 which provide the body 1 with strength and rigidity. Both the windmills of FIGS. 2 and 3 have bodies 1 which are not as aerodynamically advantageous as that of FIG. 1, but the bodies are cheaper to construct.

Figure 4:
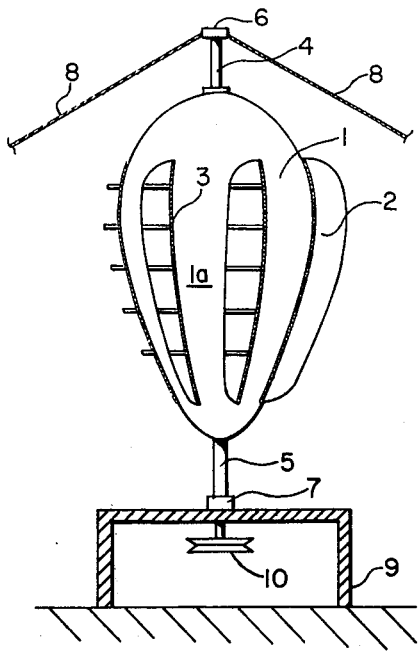
FIG. 4 is an elevation of a windmill in accordance with still another embodiment of the present invention.
Figure 5:
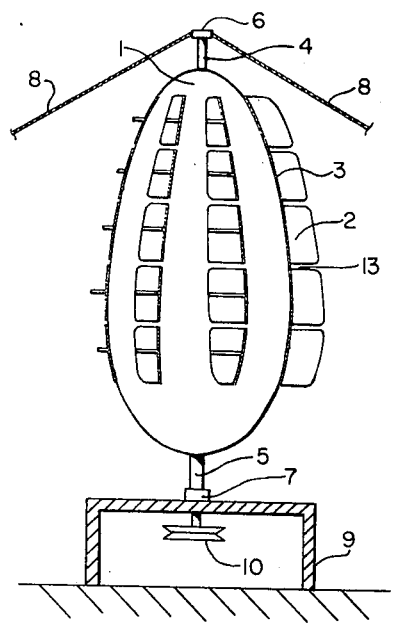
FIG. 5 is an elevation of a windmill in accordance with another embodiment of the present invention.

Referring to FIG. 4, the windmill is the same as that in FIG. 1 except that the body 1 is ovoid without any modification thereof. The ovoid shape of the body 1 is ideal aerodynamically. However, the mounting of the vanes on a curved lower surface 1a is more difficult particularly when using piano-type hinges which are advantageous and thus the modified ovoid shape of the body 1 as shown in FIG. 1 allowing such mounting is preferable. Alternately, however, as shown in FIG. 5 in a body 1 of ovoid shape, lateral splitting of the vanes 2 by splits 13 facilitates the mounting thereof with piano-type hinges 3.

In operation as shown particularly in FIG. 6 the body 1 rotates under the action of the prevailing winds. The vanes 2 move to their open position in which they are stopped by the feather members 10 as they move downstream of the wind whereby the thrust of the wind on the vanes 2 causes rotation of the body 1 and move to a closed position as they subsequently move upstream of the wind 2 to provide minimum wind resistance.

Figure 10:
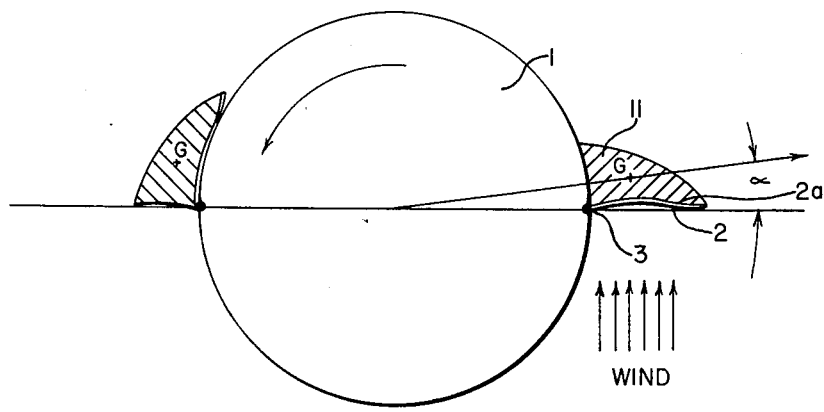
FIG. 10 is a section similar to the section of FIG. 6 through the windmill of FIG. 1 showing the location of the centre of gravity of the vanes when the windmill is rotating substantially below maximum speed.
Figure 11:
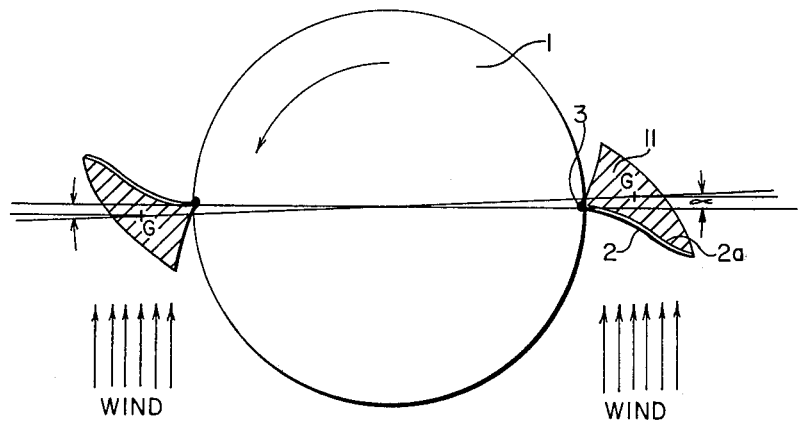
FIG. 11 is a similar view of FIG. 10 of the windmill of FIG. 1 operating at maximum speed.

The vanes 2 and feathers 3 are of such mass and dimensions that as shown in FIG. 10 the centre of gravity G lies in the feather members 11 and thus in their fully opened and closed positions, the radial lines through the centre of gravity of the vane 2 is at an angle $\alpha$ to the radial lines through the hinge 3. As the rotation of the body 1 increases, due to an increase in wind velocity, the centrifugal force on the vanes 2 tends to move the vanes 2 against the action of the wind to bring the centre of gravity G onto the radial line through the hinge 3. Thus, as the speed of rotation of the body 1 increases, a centrifugal force is exerted on the vanes 2 in all positions during their rotation and in particular, decreases the surface of each vane 2 exposed to the wind on one side and increases it on the other. Both these movements tend to slow the rotation of the body 1. Thus, the effect of the centrifugal force increases twice as rapidly as the increase of the thrust of the wind or more particularly the thrust applied by the wind as the wind increases in velocity. Thus, at high speeds of rotation of the body 1 the centrifugal force rotates the vanes 2 against the wind and thus reduces the width of the vane 2 facing the wind and the angle $\alpha$ becomes smaller the faster the rotation of the body 1 until the thrust of the wind and the centrifugal vector meets an equilibrium position at the angle $\alpha$ as shown in FIG. 11 when the speed of rotation of the windmill becomes constant. Thus, the windmill has a maximum speed of rotation and is thus self-governing.

The embodiments of the invention in which an exclusive property or privilege is claimed are defined as follows:

1. A device for converting wind energy into rotational kinetic energy comprising a body mounted for rotation about a vertical longitudinal axis thereof, said body being open to the action of the wind, a plurality of horizontally spaced vertically extending vanes pivotably mounted on said body for rotation between an open position in which the vane extends outwardly from the body and a closed position in which the vane lies with one surface thereof adjacent the surface of the body, and a plurality of feather members spacedly mounted longitudinally of each vane and extending outwardly and transversely of the surface opposite to said one surface of said vane, said feather members being dimensioned to abut said body when said vane is in said open position to provide stop means for each vane, the centre of gravity of each vane being located at a position in the feather members such that on the rotational speed of the body reaching a preselected maximum all the vanes assume a position between the open and closed position.

2. A device as claimed in claim 1, in which the body has continuously curved sidewalls, each vane being laterally curved such that in said closed position, said vane lies close to the surface of said body.

3. A device as claimed in claim 2, in which the edge portion of each vane remote from the pivot mounting is laterally curved in a direction opposite to the remainder of the vane.

4. A device as claimed in claim 3, in which each of the vanes is downwardly tapered.

5. A device as claimed in claim 4, in which the body is cylindrical.

6. A device as claimed in claim 4, in which at least that portion of the body to which the vanes are attached is downwardly tapered.

7. A device as claimed in claim 6, in which the body is in the form of two cones joined at their bases, the upper cone having a larger conical angle than the lower cone.

8. A device as claimed in claim 6, in which the body is generally ovoid.

9. A device as claimed in claim 6, in which the body is ovoid and in which each vane has a plurality of lateral splits therein such that the pivoted edge of the vane may closely follow the contour of the body.

10. A device as claimed in claim 1 in which the body is a shell.

11. A device as claimed in claim 4 in which the body is a shell.

12. A device is claimed in claim 7 in which the body is a shell.

13. A device as claimed in claim 1 in which the feathers are mounted at right angles to the vanes.

14. A device as claimed in claim 1 in which the vanes are hingedly mounted on the body.

* * * * *